United States Patent
Yang et al.

(10) Patent No.: US 11,338,659 B2
(45) Date of Patent: May 24, 2022

(54) METHOD OF MAKING A WEATHER STRIP AND BRIGHT STRIP ASSEMBLY FOR A VEHICLE DOOR

(71) Applicant: HUTCHINSON SEALING SYSTEMS, Auburn Hills, MI (US)

(72) Inventors: Will Yang, Auburn Hills, MI (US); André Guellec, Auburn Hills, MI (US); Todd Braund, Auburn Hills, MI (US); Emilio Sakaguti, Auburn Hills, MI (US)

(73) Assignee: HUTCHINSON SEALING SYSTEMS, Auburn Hills, MI (US)

( * ) Notice: Subject to any disclaimer, the term of this patent is extended or adjusted under 35 U.S.C. 154(b) by 464 days.

(21) Appl. No.: 16/375,742

(22) Filed: Apr. 4, 2019

(65) Prior Publication Data

US 2020/0317037 A1 Oct. 8, 2020

(51) Int. Cl.
*B60J 10/76* (2016.01)
*B29C 48/00* (2019.01)
*B29C 48/16* (2019.01)
*B60R 13/04* (2006.01)
*B60J 10/27* (2016.01)

(52) U.S. Cl.
CPC ........... *B60J 10/76* (2016.02); *B29C 48/0019* (2019.02); *B29C 48/0022* (2019.02); *B29C 48/16* (2019.02); *B60J 10/27* (2016.02); *B60R 13/04* (2013.01)

(58) Field of Classification Search
USPC ....................................................... 49/479.1
See application file for complete search history.

(56) References Cited

U.S. PATENT DOCUMENTS

| | | | |
|---|---|---|---|
| 7,934,341 B2 | 5/2011 | Knight et al. | |
| 8,925,996 B2 | 1/2015 | Senge | |
| 10,752,184 B2 | 8/2020 | Husek et al. | |
| 2007/0271853 A1 | 11/2007 | Katsuda et al. | |
| 2010/0186301 A1 | 7/2010 | Drozd et al. | |

(Continued)

FOREIGN PATENT DOCUMENTS

| | | |
|---|---|---|
| CN | 202264710 U | 6/2012 |
| CN | 103158517 A | 6/2013 |

(Continued)

*Primary Examiner* — Niki Bakhtiari
*Assistant Examiner* — John J DeRusso
(74) *Attorney, Agent, or Firm* — Christensen O'Connor Johnson Kindness PLLC

(57) ABSTRACT

Methods of making a weather strip and bright strip assembly for a vehicle door include extruding a weather strip that has a longitudinal shape along an X axis, a sealing body made of at least a first material, and a carrier body made of at least a second material that is harder than the first material. The methods further include cutting at least in part a longitudinal end of the carrier body along the X axis, and removing the longitudinal end; molding a curved or angled end onto the weather strip, in replacement of the longitudinal end, wherein the curved or angled end extends between the X axis and a Y axis; and mounting a bright strip onto the carrier body, the bright strip including a first curved or angled portion covering at least in part the curved or angled end and a second longitudinal portion covering at least in part the carrier body.

14 Claims, 3 Drawing Sheets

(56) References Cited

U.S. PATENT DOCUMENTS

| | | | | |
|---|---|---|---|---|
| 2016/0089962 A1* | 3/2016 | Kuroki | ................... | B60J 10/76 49/442 |
| 2016/0130862 A1 | 5/2016 | Laycoe et al. | | |
| 2020/0101828 A1* | 4/2020 | Oshima | ................. | B60J 5/0402 |

FOREIGN PATENT DOCUMENTS

| | | | |
|---|---|---|---|
| CN | 203254940 | U | 10/2013 |
| CN | 103395355 | A | 11/2013 |
| CN | 103692890 | A | 4/2014 |
| CN | 203681231 | U | 7/2014 |
| CN | 203854581 | U | 10/2014 |
| CN | 106553595 | A | 4/2017 |
| EP | 0684158 | A1 | 11/1995 |
| EP | 1293372 | A1 | 3/2003 |
| EP | 1864842 | A1 | 12/2007 |
| EP | 1910111 | A2 | 4/2008 |
| EP | 2167774 | A1 | 3/2010 |
| EP | 2467275 | A1 | 6/2012 |
| EP | 2542432 | A1 | 1/2013 |
| EP | 2551138 | A1 | 1/2013 |
| EP | 3310602 | A1 | 4/2018 |
| JP | 2008239105 | A | 10/2008 |
| WO | 2018/035357 | A1 | 2/2018 |

* cited by examiner

METHOD OF MAKING A WEATHER STRIP AND BRIGHT STRIP ASSEMBLY FOR A VEHICLE DOOR

TECHNICAL FIELD

The present disclosure provides methods of making a weather strip and bright strip assembly. The present disclosure also provides a weather strip and bright strip assembly and a vehicle door comprising such assembly.

BACKGROUND

A vehicle door includes a moveable glass panel that may slide from an upper position to a lower position and from the lower position to the upper position. The door comprises a lower body and an upper frame. In its lower position, the glass panel is located at least in part inside the door body and, in its upper position, the glass panel is surrounded by the frame which extends along the peripheral edges of the glass panel.

Sealing between the glass panel and the door frame is ensured by a glass run channel (GRC) which is secured onto the frame and extends along this frame. The GRC defines a channel in which the glass panel is able to slide when moving. The GRC may further include sealing lips abutting against outer and inner surfaces of the glass panel. Typically, the GRC is U-shaped and comprises two vertical profiles which are connected therebetween at their upper ends by a horizontal profile. The profiles of the GRC are each produced by extrusion and are then bonded to each other by overmolding bonding corners between the upper ends of the vertical profiles and the longitudinal ends of the horizontal profile.

Sealing between the glass panel and the door body is namely ensured by an outer belt which is secured on an outer panel of the door body and includes a sealing lip abutting against the outer surface of the glass panel. The outer belt extends horizontally between the lower ends of the frame and between the vertical profiles of the GRC.

The exterior appearance of a vehicle door is very important for the customer, i.e., the user of the vehicle. A solution for enhancing the appearance of a vehicle door is to provide the GRC and the outer belt with bright strips. For instance, a first longitudinal bright strip may be applied and secured onto a vertical profile of the GRC and a second longitudinal bright strip may be applied and secured onto the outer belt. The lower end of the first bright strip may be close to one of the longitudinal ends of the second bright strip. However, there is a need to enhance the appearance in this area and also to propose a simplified method to make such assembly.

The present disclosure provides a response to this need.

SUMMARY

In an aspect, the present disclosure provides a method of making a weather strip and bright strip assembly, comprising the steps of:
 a) extruding a weather strip having a longitudinal shape along an X axis, the weather strip including a sealing body made of at least a first material and a carrier body made of at least a second material that is harder than the first material,
 b) cutting at least in part a longitudinal end of the carrier body along the X axis, and removing the longitudinal end,
 c) molding a curved or angled end onto the weather strip, in replacement of the longitudinal end, the curved or angled end extending between the X axis and a Y axis,
 d) mounting a bright strip onto the carrier body, the bright strip including a first curved or angled portion covering at least in part the curved or angled end and a second longitudinal portion covering at least in part the carrier body.

In another aspect, the present disclosure provides a solution for enhancing the aesthetic appearance, for instance between a vertical profile of a GRC which would be formed by the weather strip, and an outer belt. In this case, the vertical profile of the GRC would be partially cut at step b) and would receive a molded end that would be curved or angled. This curved or angled end would allow forming a curved or angled transition between the lower end of the vertical profile and the most proximate longitudinal end of the outer belt. Both of the outer belt and the vertical profile may be covered by a bright strip and the bright strip of the vertical profile would include two portions as recited above. The second portion would be similar to a prior art bright strip and the first portion would be curved or angled so as to cover the above mentioned curved or angled transition and to enhance esthetic appearance of the assembly. The first portion would ensure a smooth and continuous bright appearance between the outer belt and the GRC. First and second portions of the bright strip may be secured to one another or may be formed as a single part.

The method according to the present disclosure may comprise one or more of the following features and/or steps, taken alone from each other or in combination with each other:
 the curved or angled end is made of a material which is identical of the second material;
 step b) allows reducing a length of at least a portion of the carrier body relative to a length of the sealing body, the length being measured along the X axis;
 the carrier body is U-shaped and comprises two longitudinal legs connected together by a longitudinal bridge, step b) including cutting and removing one of the longitudinal legs;
 step b) includes cutting and removing at least in part the longitudinal bridge;
 the longitudinal legs have different widths, the step b) including cutting and removing the leg having the greater width;
 the X and Y axes are inclined at an angle in the range of 50 to 120°;
 the X and Y axes are inclined at an angle in the range of 80 to 100°;
 the curved or angled end is U-shaped and comprises two curved or angled legs connected together by a curved or angled bridge;
 the bright strip comprises two opposite longitudinal edges which are bent and form hooks for securing the bright strip onto at least the carrier body, and optionally onto the curved or angled end;
 the sealing body and/or the carrier body comprise(s) sealing lips;
 the sealing body includes a groove intended to receive a movable glass panel;
 the sealing body is configured to be mounted onto and along a frame of a door vehicle;
 the curved or angled end protrudes along the Y axis from the bright strip;
 the step c) allows securing the weather strip to a belt weather strip, the belt weather strip being extruded and having a longitudinal shape along the Y axis, the belt weather strip including a longitudinal end connected to the curved or angled end.

The present disclosure further proposes a weather strip and bright strip assembly made by the method as recited above.

The present disclosure further provides a vehicle or vehicle door comprising a weather strip and bright strip assembly, the weather strip and bright strip assembly extending onto and along a frame and having a groove receiving a movable glass panel. The vehicle or vehicle door may further include an outer belt weather strip having a longitudinal axis aligned with the Y axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

FIGS. 1 to 4 illustrate an embodiment of the method and of the assembly according to the present disclosure.

The method relates to making a weather strip and bright strip assembly. Such assembly will be described hereinbelow in relation with a glass run channel and an outer belt of a vehicle door but this should not be considered as limitative since the present disclosure may be useful and used for other kind of vehicle door sealing kit.

Figure 1:
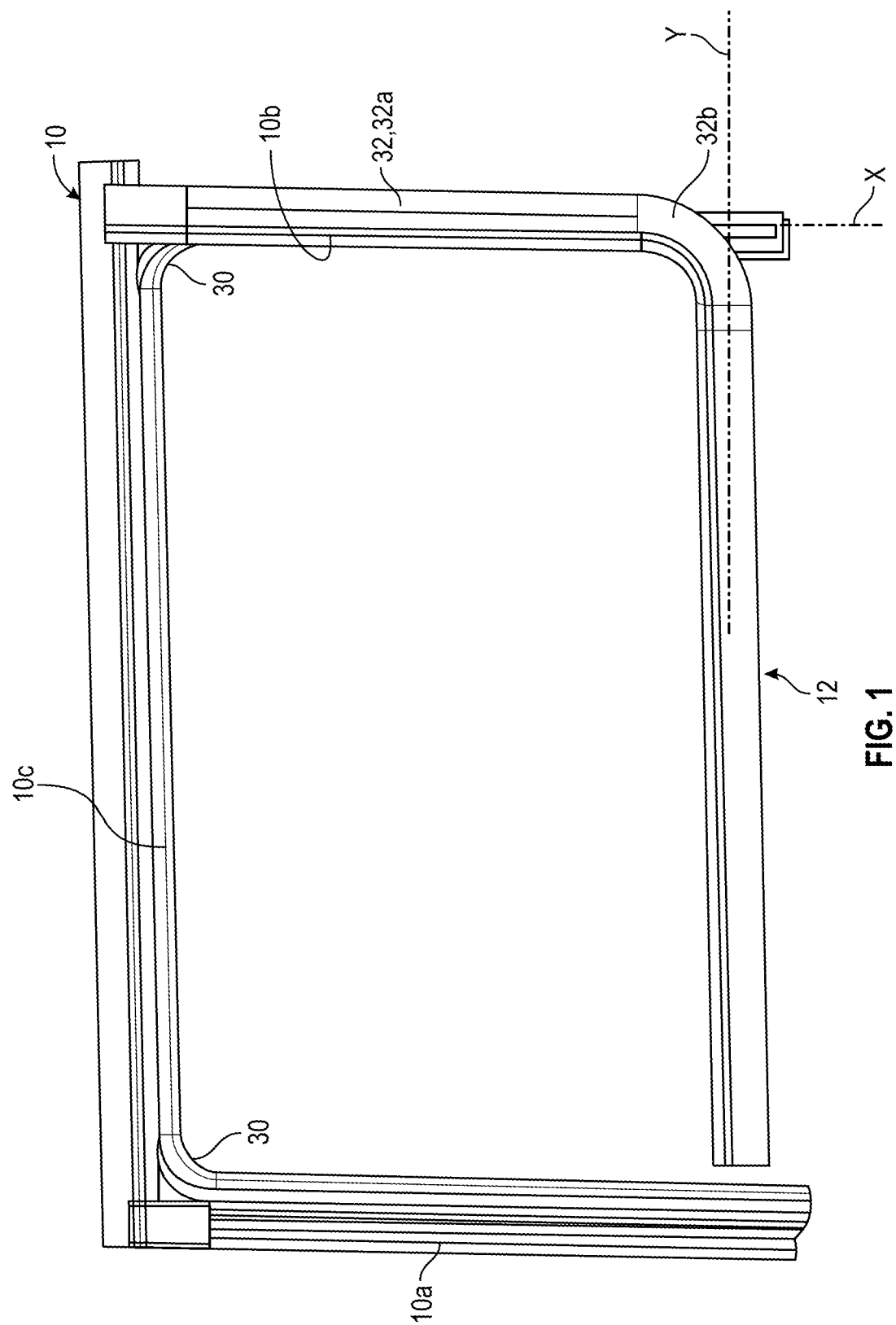
FIG. 1 is a schematic view of a vehicle door sealing kit including a glass run channel and an outer belt according to an aspect of the present disclosure.
Figure 2:
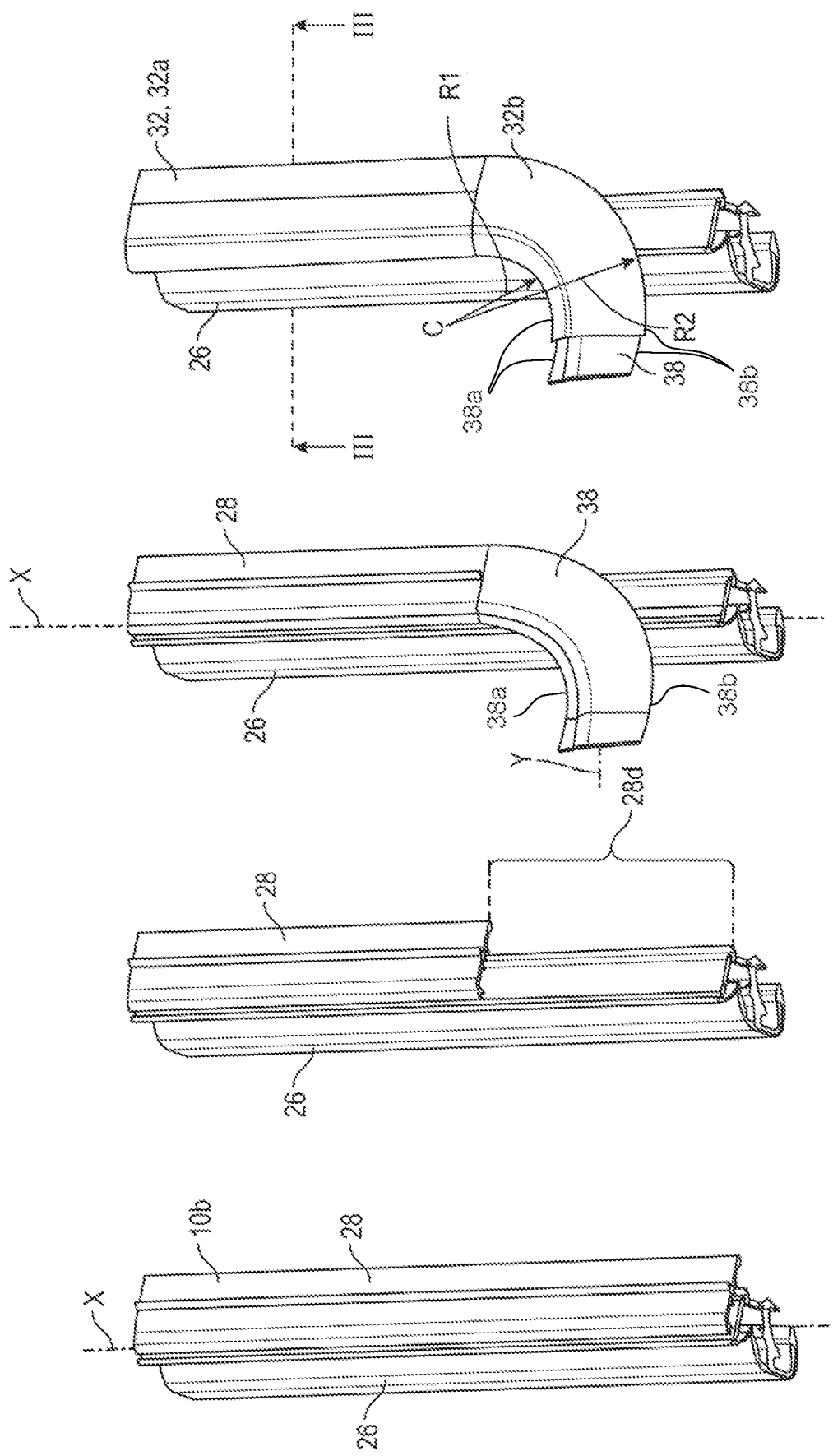
FIGS. 2a to 2d are enlarged schematic views of a profile of the glass run channel of FIG. 1, and show steps of an embodiment of the method according to the present disclosure.

FIG. 1 shows a vehicle door sealing kit including a glass run channel (GRC) 10 and an outer belt 12 of a vehicle door. The GRC 10 is intended to be secured onto a door frame and to extend along this frame. The GRC 10 is U-shaped and comprises two vertical profiles 10a, 10b which are connected therebetween at their upper ends by a horizontal profile 10c.

The GRC 10 defines a channel 14 in which the glass panel 16 is able to slide when moving. In the example shown in FIG. 3 which is a cross sectional view of the vertical profile 10b, this profile is substantially S-shaped and includes two longitudinal and adjacent channels 14, 18. The first channel 14 is oriented toward the glass panel 16 and configured to receive this glass panel when it is moved. The second channel 18 is oriented to the opposite side and is configured to cooperate with the door frame to secure the GRC 10 onto this frame.

The profile 10b and its second channel 18 may comprise retaining lug(s) 20 intended to cooperate with the door frame for securing the GRC 10. The profile 10b and its first channel 14 may comprise sealing lips 22 intended to abut against outer and inner surfaces 16a, 16b of the glass panel 16 and ensure sealing between the GRC 10 and the glass panel 16.

In the example shown, the profile 10b comprises a third longitudinal channel 24. This channel 24 is adjacent the channel 14 which is located between the channels 18, 24. Channels 18 and 24 are oriented in the same direction which is opposite to the direction of the channel 14. Channel 24 may be intended to receive a garnish strip of the door.

The profiles 10a-10c of the GRC 10 are each produced by extrusion and may be formed by one or more materials. In the example shown, the profile 10b is made of at least two different materials and for instance three materials.

Channels 14 and 24 are defined by a sealing body 26 of the profile 10b, the sealing body 26 being made of one or two materials and for instance by a thermoplastic vulcanizate (TPV). Channel 18 is defined by a carrier body 28 of the profile 10b, the carrier body 28 being made by a material which is different from the material(s) of the sealing body. The material of the carrier body 28 is for instance polypropylene. Both materials of the carrier and sealing bodies 26, 28 may be polymer materials.

According to the present disclosure, the material of the carrier body 28 is harder than the material of the sealing body 26. For instance, the carrier body 28 has a hardness higher than the hardness of the sealing body 26, or the carrier body has a stiffness higher than the stiffness of the sealing body. The carrier body may for instance has a Shore A hardness of 85 durometer. The sealing body may for instance has a Shore A hardness of 70 durometer.

The extruded profiles 10a-10c are connected to each other by overmolding bonding corners 30 between the upper ends of the vertical profiles 10a, 10b and the longitudinal ends of the horizontal profile 10c (FIG. 1).

Sealing between the glass panel 16 and the door body is ensured by the outer belt 12 which forms a weather strip and is secured on an outer panel of the door body and includes a sealing lip (not shown) abutting against the outer surface 16a of the glass panel 16. The outer belt 12 extends horizontally between the lower ends of the frame and between the vertical profiles 10a, 10b of the GRC 10.

The outer belt 12 is also formed by an extruded profile which extends horizontally between the lower ends of the door frame and between the vertical profiles 10a, 10b of the GRC 10. The outer belt 12 may include a bright strip (not shown) which is secured to its extruded profile by hooks for instance. The profiles 10a-10c of the GRC 10 may also comprise one or more bright strip(s). In the embodiment shown, the profile 10b receives a bright strip 32. The bright strip 32 extends along the profile 10b and may comprise also hooks for securement onto the profile 10b.

Figure 3:
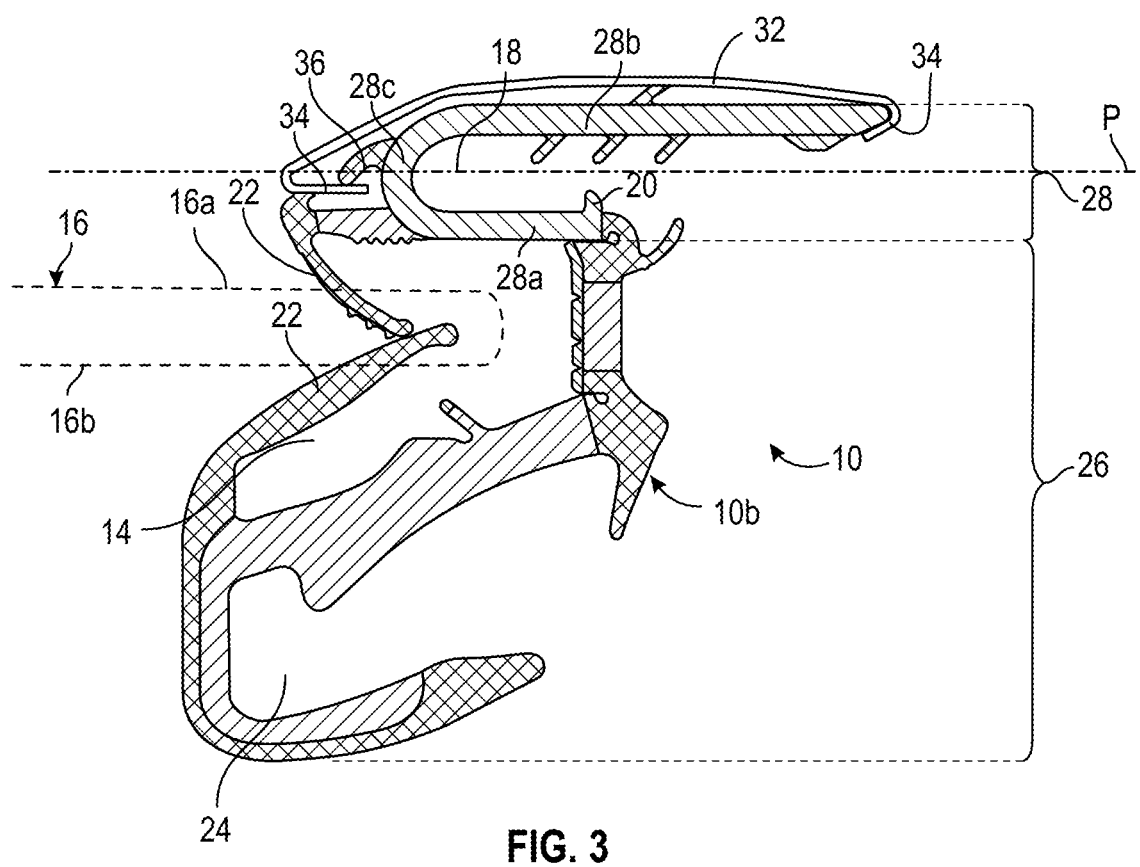
FIG. 3 is a schematic cross sectional view along line III-III of FIG. 2d.
Figure 4:
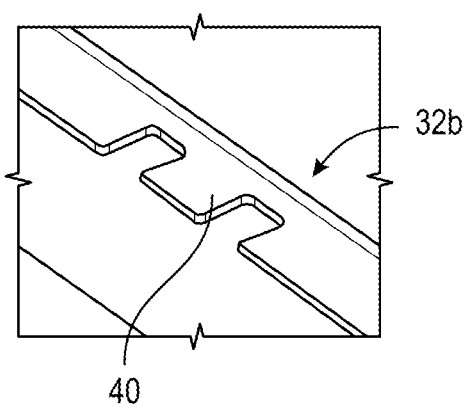
FIG. 4 is a schematic perspective view of a portion of a bright strip of the glass run channel of FIG. 1.

As shown in FIG. 3, the bright strip 32 is formed by an elongated plate, for instance made of steel or aluminum, having folded longitudinal edges so as to form two longitudinal hooks 34. These hooks 34 cooperate with complementary portions of the carrier body 28 so as to retain the bright strip 32.

In the example shown, the carrier body 28 is U-shaped and includes two legs, respectively an inner leg 28a and an outer leg 28b. The legs 28a, 28b are connected therebetween by an intermediary wall or bridge 28c. The inner leg 28a is closely linked to the sealing body 26 and delimits a portion of the channel 14. The outer leg 28b has a width which is greater than the width of the inner leg 28a. The outer leg 28b is intended to be covered by the bright strip 32, one of the hooks 34 of which being retained onto the free longitudinal edge of the outer leg 28b. The other hook 34 of the bright strip 32 is retained onto a retaining lug 36 located on the bridge 28c.

In another aspect, the present disclosure provides a new weather strip and bright strip assembly and also a method of making such assembly. One of the features shown in FIGS. 1 and 2d is linked to the fact that the bright strip 32 further includes a corner or angled portion 32b connected to an elongated portion 32a.

In the example shown, this portion 32b is located at a lower end of the bright strip 32 and is intended to ensure an enhanced appearance in the area where the lower end of the profile 10b is closed or linked to the outer belt 12.

The portion 32b is advantageously secured to a complementary end 38 of the carrier body 28 of the profile, i.e., a curved or angled end of the carrier body 28. This end 38 is shown in FIGS. 2c and 2d. These figures further show that this end 38 is located in a cut end 28d of the carrier body 28 of the profile 10b.

The size and shape of the end 38 and the portion 32b may be chosen according to the expected appearance. They may have two curved edges 38a, 38b having curvature radius R1, R2 centered on the same center C. The difference between the radius R2 and R1 is preferably equal to the width of the elongated portion 32a of the bright strip 32. The end 38 is U-shaped and may comprise two curved or angled legs connected together by a curved or angled bridge. The portion 32b and the elongated portion 32a of the bright strip 32 are preferably made of the same material, as a single piece.

For enhancing assembly of the portion 32b onto the end 38, it might be preferable not to provide its edges 38a, 38b with folded hooks cooperating with the end 38. In the example shown, each of the edges 38a, 38b of the portion 32b includes a tab 40 configured either to be engaged in a recess of the end 38 or to be folded below the outer leg of the end.

More precisely, the assembly of the weather strip formed by the profile 10b and the bright strip 32 may be performed by the following method steps:

a) extruding a weather strip as shown in FIG. 2a,
b) cutting the weather strip as shown in FIG. 2b,
c) molding the curved or angled end onto the weather strip as shown in FIG. 2c, and
d) mounting the bright strip onto the weather strip as shown in FIG. 2d.

The first step a) includes at least extruding the profile 10b. As described above, this profile 10b has a longitudinal shape along an axis which is designated by X. This profile 10b comprises the sealing body 26 and the carrier body 28, better visible in FIG. 3.

The second step b) includes at least cutting at least in part the longitudinal end 28d of the carrier body 28 along the X axis, and removing the longitudinal end 28d. Step b) intends then to reduce the length of the carrier body 28 along the X axis. In the embodiment shown, the cut is performed in a plane P which is parallel to the legs 28b, 28a and which passes between those legs (FIG. 3). It can therefore be understood that the cut passes through the bridge 28c and that the leg 28b and part of the bridge 28c are removed in the end 28d. The leg 28a is not affected by the cut.

The third step c) includes at least molding the curved or angled end 38 onto the end 28d of the profile 10b, in replacement of the removed legs 28b, 28c. The end 38 extends between an X axis and a Y axis. The Y axis is preferably aligned with the outer belt 12 (FIG. 1). The X and Y axes are inclined by an angle in the range 50 to 120°, and preferably in the range 80 to 100°. The X and Y axes are substantially perpendicular in the example shown. The end 38 has preferably a cross sectional shape which is similar to the one of the carrier body 28 shown in FIG. 3.

The fourth step d) consists at least in mounting the bright strip 32 onto the carrier body 28 and its extended end 38. The elongated portion 32a of the bright strip 32 covers the carrier body 28 and its portion 32b covers at least in part the end 38. The portion 32a is hooked onto the carrier body 28 and the portion 32b may be attached to the end 38 by the above mentioned tab(s) 40.

In the example shown, the end 38 protrudes along the Y axis from the curved or angled portion 32b (see FIG. 2d). This protrusion may be intended to be covered by the bright strip of the outer belt 12.

While illustrative embodiments have been illustrated and described, it will be appreciated that various changes can be made therein without departing from the spirit and scope of the present disclosure.

In the present specification, the words "inner", "inside", "interior", etc., make reference to the inside of a motor vehicle. The words "outer" "outside", "exterior", etc., make reference to the outside of the motor vehicle. Then, an outer element is located at the outer side of the vehicle. A first outer element, portion or surface may be visible by a user of the motor vehicle or may be hidden by a second outer element, portion or surface covering the first outer element.

The invention claimed is:

1. A method of making a weather strip and bright strip assembly for a vehicle door, comprising:
   extruding a weather strip having a longitudinal shape along an X axis, the weather strip including a sealing body made of at least a first material, and a carrier body made of at least a second material that is harder than the first material;
   cutting at least in part a longitudinal end of the carrier body along the X axis, and removing the longitudinal end;
   molding a curved or angled end onto the weather strip, in replacement of the longitudinal end, wherein the curved or angled end extends between the X axis and a Y axis; and
   mounting a bright strip onto the carrier body, the bright strip including a first curved or angled portion covering at least in part the curved or angled end and a second longitudinal portion covering at least in part the carrier body.

2. The method according to claim 1, wherein the curved or angled end is made of a third material which is identical to the second material.

3. The method according to claim 1, wherein cutting at least in part the longitudinal end includes reducing a length of at least a portion of the carrier body relative to a length of the sealing body, the length of at least the portion of the carrier body being measured along the X axis.

4. The method according to claim 1, wherein the carrier body is U-shaped and comprises a first longitudinal leg and a second longitudinal leg that are connected together by a longitudinal bridge, wherein cutting at least in part the longitudinal end includes cutting and removing one of the first or second longitudinal legs.

5. The method according to claim 4, wherein cutting at least in part the longitudinal end includes cutting and removing at least in part the longitudinal bridge.

6. The method according to claim 4, wherein the first and second longitudinal legs have different widths, and wherein cutting at least in part the longitudinal end includes cutting and removing the first or second longitudinal leg having a greater width.

7. The method according to claim 1, wherein the X axis and the Y axis are inclined at an angle in a range of 50 to 120 degrees.

8. The method according to claim 1, wherein the X axis and the Y axis are inclined at an angle in a range of 80 to 100 degrees.

9. The method according to claim 1, wherein the curved or angled end is U-shaped and comprises two curved or angled legs connected together by a curved or angled bridge.

10. The method according to claim 1, wherein the bright strip comprises two opposite longitudinal edges which are bent and form hooks configured to secure the bright strip onto at least the carrier body.

11. The method according to claim 1, wherein at least one of the sealing body or the carrier body comprise(s) a plurality of sealing lips.

12. The method according to claim 1, wherein the sealing body includes a groove configured to receive a movable glass panel.

13. The method according to claim 1, wherein the sealing body is configured to be mounted onto and along a frame of a vehicle door.

14. The method according to claim 1, wherein the curved or angled end protrudes along the Y axis from the bright strip.

* * * * *